G. C. PHILLIPS.
COTTON PICKING MACHINE.
APPLICATION FILED MAY 13, 1913.
1,107,627.
Patented Aug. 18, 1914.
4 SHEETS—SHEET 1.
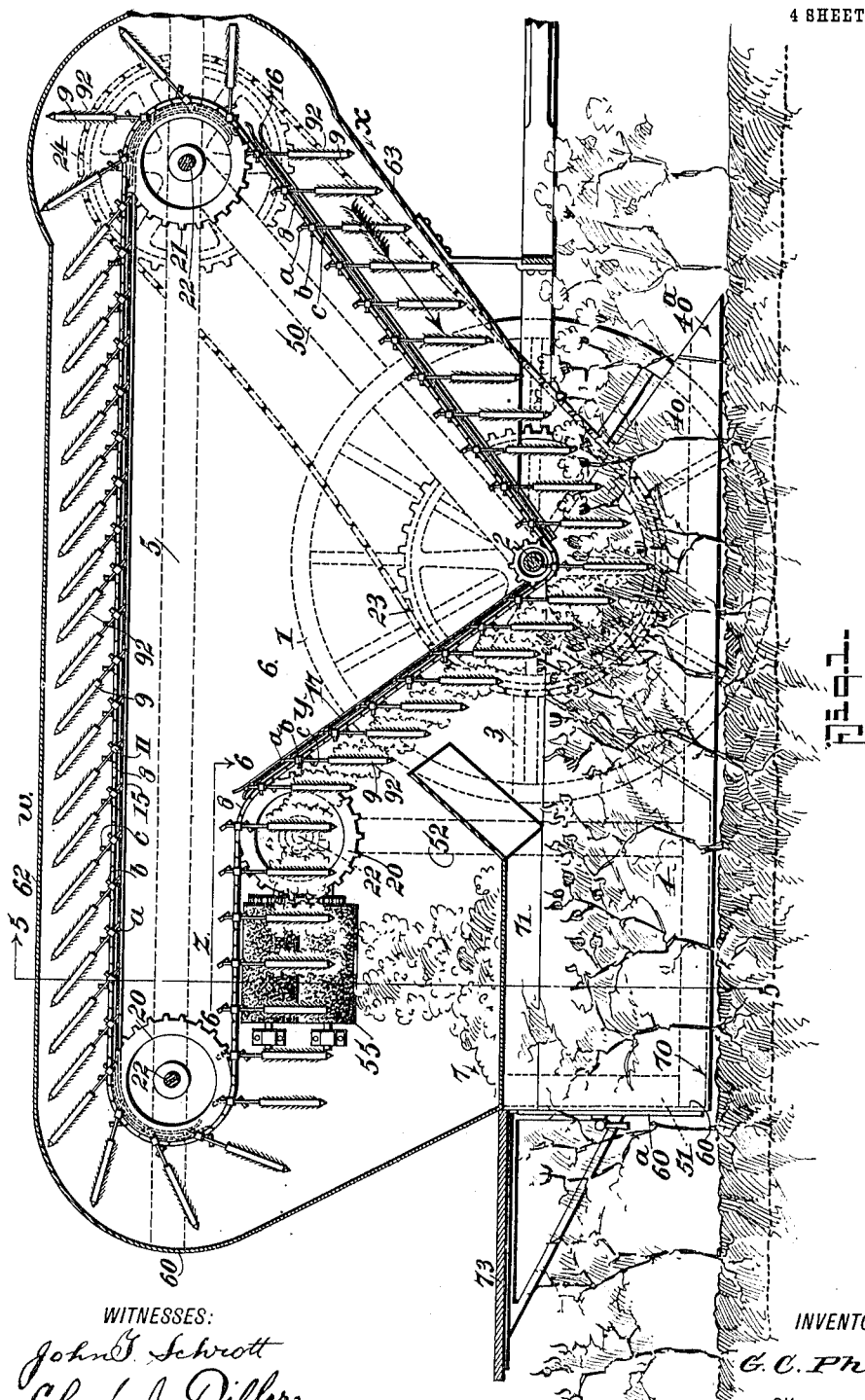
WITNESSES:
John T. Schrott
Charles J. Diller
INVENTOR
G. C. Phillips.
BY
Fred G. Dieterich
ATTORNEYS G. C. PHILLIPS.
COTTON PICKING MACHINE.
APPLICATION FILED MAY 13, 1913.
1,107,627.
Patented Aug. 18, 1914.
4 SHEETS—SHEET 2.
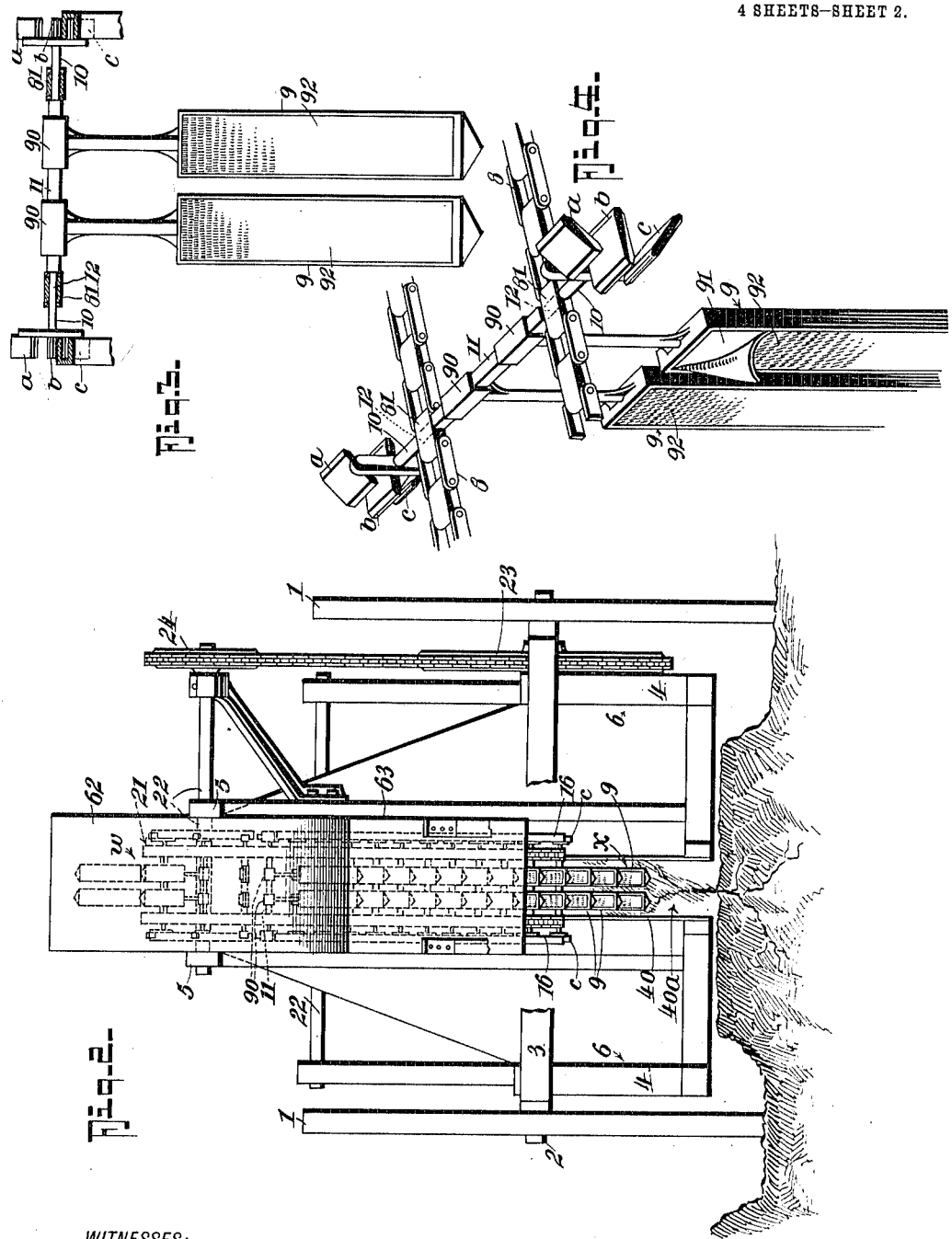
WITNESSES:
John G. Schrott
Charles J. Diller
INVENTOR
G. C. Phillips
BY
Fred G. Dieterich & Co
ATTORNEYS

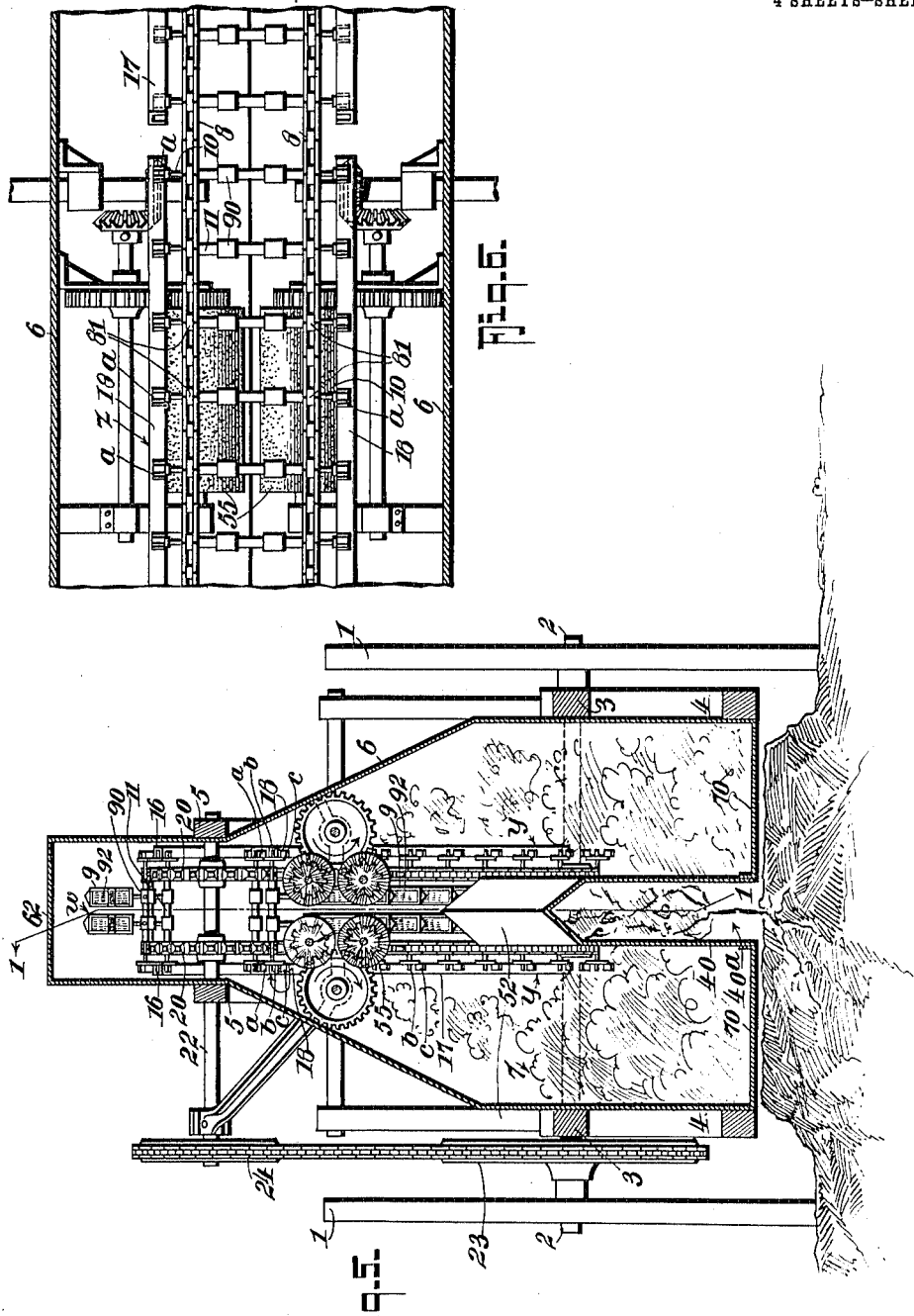

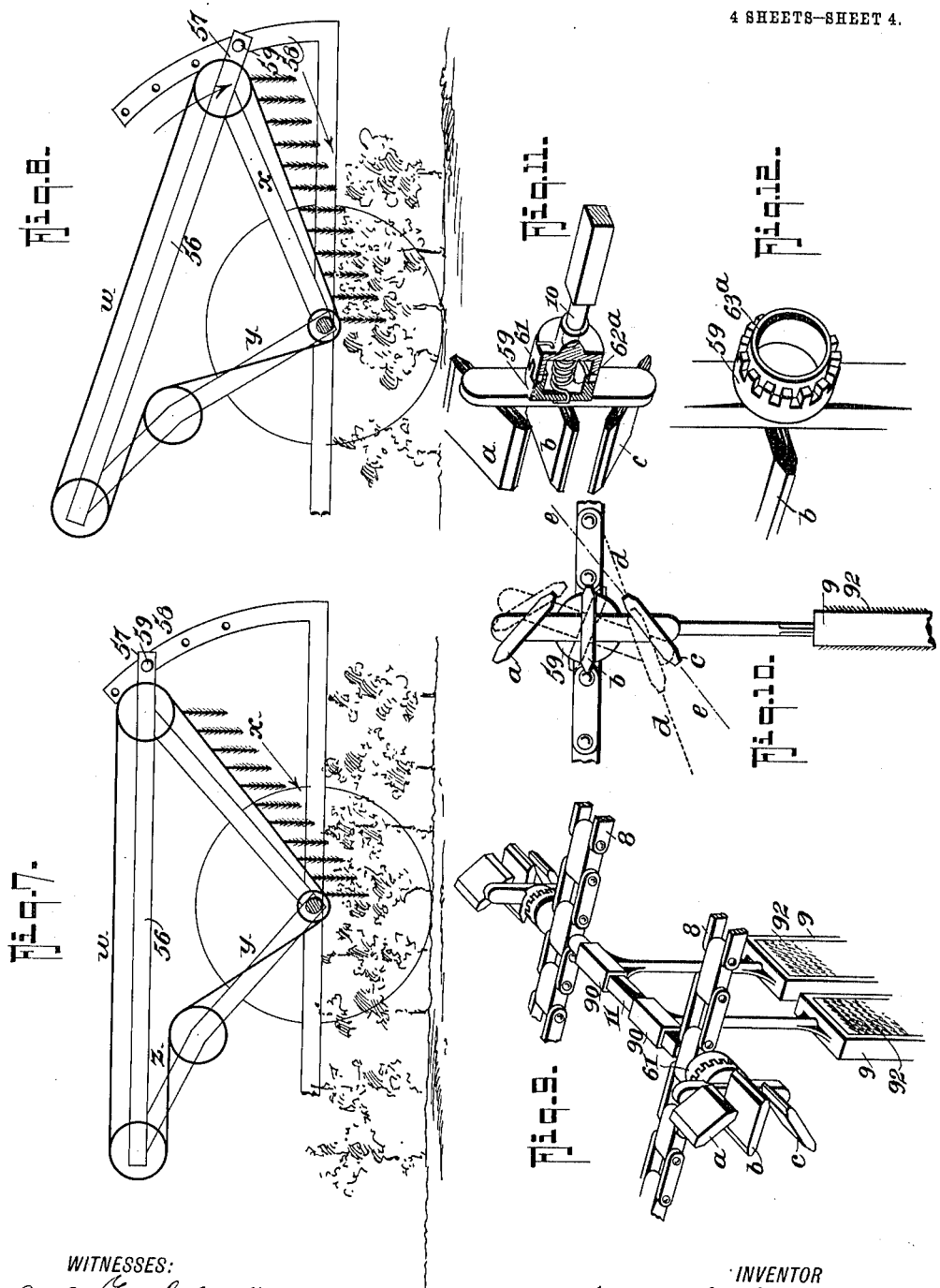

UNITED STATES PATENT OFFICE.

GEORGE C. PHILLIPS, OF BOGALUSA, LOUISIANA.

COTTON-PICKING MACHINE.

1,107,627. Specification of Letters Patent. Patented Aug. 18, 1914.

Application filed May 13, 1913. Serial No. 767,275.

*To all whom it may concern:*

Be it known that I, GEORGE C. PHILLIPS, residing at Bogalusa, in the parish of Washington and State of Louisiana, have invented a new and Improved Cotton-Picking Machine, of which the following is a specification.

My present invention relates to that class of cotton picking machines, in which are included toothed members so arranged, on a wheeled frame, that they travel on both sides of a row of cotton plants, work in contact therewith for stripping the cotton from the plant and depositing the picked cotton into receptacles carried on the wheeled frame.

My present invention, in its more generic nature, contemplates the employment of card-cloth surfaces for picking faces and adapted for being thrust downwardly into and against the row of plants, and with their card-cloth points inclined upwardly and then moved upwardly to strip the cotton and carry the picked cotton up with them, means coöperating with the said picking device being also included for clearing the picking devices and to deposit the gathered cotton.

My invention also contemplates the utilization of an endless chain of sets of uniformly hung picker faces arranged for wiping off the cotton from the plants as they engage the cotton bolls, and means for instantly decreasing the spaces when the pickers start upwardly after having engaged the plants and then again causing the sets of picker faces to spread to their normal separations as they are engaged by the cleaning means.

One of the objects of my invention is to provide a cotton picking means, embodying the general features above outlined, of a compact, and economical construction, and which effectively serves its intended purposes.

With other objects in view that will be hereinafter set out, my invention, in its more subordinate features consists in the peculiar arrangement and the novel combination of the parts hereinafter fully explained, specifically pointed out in the appended claims, and illustrated in the accompanying drawings, in which:

Figure 1 is a vertical longitudinal section of my cotton picking machine, taken substantially on the line 1—1 on Fig. 5. Fig. 2 is a front elevation thereof. Fig. 3 is a front view of a pair or "one set" of the endless chain of picker members or faces hereinafter referred to. Fig. 4 is a perspective view of a portion of the endless chains that support and convey the picker members or faces, the means for connecting the said faces to the chains and the several "lugs" for holding the pickers to the three different positions hereinafter referred to, being also shown. Fig. 5 is a cross section of my cotton picking machine taken on the line 5—5 on Fig. 1. Fig. 6 is a detail view, parts being in horizontal section of a portion of the machine taken on line 6—6 Fig. 1. Figs. 7 and 8 are diagrammatic views showing a modified method of mounting the pickers, the operation being hereinafter described. Figs. 9 to 12 inclusive show a means for adjusting the guide lugs, the application thereof being hereinafter more fully described.

In the accompanying drawings, I have illustrated a preferred arrangement of parts combined and arranged for practically effecting the results for which my present invention is provided, but I desire it understood that the exact arrangement and the detailed construction of the several parts shown may be readily modified or varied without departing from my invention, or from the scope of the appended claims.

In carrying out my present invention, my improved cotton picking mechanism proper is mounted on a wheeled frame, consisting of the carrier and driving wheels 1—1 mounted on the axle 2 on which are supported longitudinal beams 3—3 from each of which hangs a pendent side frame 4.

5—5 designates horizontally extended side frames that include the diagonally and forwardly extended beams 50, and the vertical beams 51—52, the general arrangement of which is clearly indicated by the dotted lines on Fig. 1.

By referring to Fig. 5, it will be noticed that centrally of the machine, is a restricted passage 40ª formed by the opposing guide plates 40—40, the front ends of which taper to form penetrating ends for extending between the plant rows and for straightening the stalks to bring the entire plants within the restricted passage 40ª which, in practice, is of sufficient space to provide ample room for the ordinary upland cotton plant. The guide 40 and the wheel axle are relatively so arranged that all the plants pass under the axle of the machine and through the passage 40ª.

The cotton picking means, to be presently described, is cased in by the sheet metal housing which includes the opposite side walls 6—6, the rear wall 60 having doors 60ª through which the gathered cotton is removed from receiving boxes 7 formed by the closed bottom 70, and the upwardly inclined wall 71, the latter also acting as a retarding member for holding the plants down toward the picker members. The housing also includes the top 62 and the front inclined wall 63 that extends down to the horizontal beams of the supporting frame, such housing being unnecessary so far as the picking operation is concerned, but it merely serves to protect the driver.

73 designates a platform at the rear of the vehicle upon which the driver may stand.

The picking means, the peculiar construction of which, forms the essential feature of my present invention, and which is clearly illustrated in Figs. 1, 5 and 6 of the drawings, consists of two endless chains 8—8 to each of which is connected an endless series of picker members 9 arranged in pairs, each pair being fixedly connected, by means of a sleeve 90, mounted on the squared portion 11 of a cross bar 10, the opposite ends of which are reduced to form journals 12, which are rockably mounted in solid link members 81 of their respective chains 8, as is best shown in Figs. 3 and 4, the latter view also clearly showing the relative arrangement of the three lugs a—b—c on each end of the cross rod 9, the purpose of which will presently appear. Each picker member is composed of a flat body, preferably a flat board 91, on the opposite faces of which is secured, in any approved manner, card-cloth 92, the teeth of which project upwardly at an acute angle to the face of the board, such card-cloth being fine enough not to engage a green boll, a bunch of green leaves, but cotton lint and dry dead leaves only, such leaves and other objectionable matter being eliminated when the cotton is passed through the gin. It will be noticed the picking members or faces of each pair of members are in transverse alinement and in practice they are of such width and relatively so spaced that in traveling through the passage 6 which, in practice, is about six and one-half inches wide, the said picking faces are about one-half inch apart and their outer edges are about one-half an inch away from the side guides 40 that form the throat or passageway 4. It will be also noticed, by referring to Figs. 5 and 6, that the picker faces are so hung from the chains, that they engage the plants flatwise, that is, with their wide or carded faces, and at this point it should be stated, the said pickers, no matter at what position they may be adjusted in their passage with the endless chains, are rigidly held to such positions, so that at no time can any of the individual sets of picker faces interfere or become clogged with the other ones of the said faces.

By referring now more particularly to Fig. 1, it will be noticed that I have arranged the endless chain of pickers in a practically irregular triangular form, comprising a long horizontally extended side w, a front x that extends downwardly and inwardly at an acute angle to the long side w, and an upwardly and rearwardly inclined side y that extends in a plane substantially at right angles to the side x, and hence at a more abrupt incline than that of the side y, the said incline y terminating with a short horizontal or straight portion z parallel with the side w. The chains 8 travel over chain wheels 20—21 on cross shafts 22, journaled in the vertically extended portion of the framing, chain gears 23 on the driving wheel axle and chain gears 24 on the upper cross shaft 22 serve as the driving power of the machine.

With each section of the endless chains coöperate a pair of side guides, in the nature of horizontally grooved members 15—16—17 and 18, the said grooved members being adjacent the chain sections w, x, y and z, respectively, and the several grooved or guide members are also independently so arranged that the central lugs b on the respective picker member supporting cross rods, as the chains pass along the section z, engage the guide grooves 15 and the lugs c engage the guide grooves 16 as the chain passes along the front inclined section X while the lugs a fit in guide grooves 17, when going up the incline y, it being understood that the lugs b also engage the short straightway guide grooves 18 as the chains pass along the section z, and that the front or entrant ends of the aforesaid guide grooves (see Fig. 1) and the several lugs that co-act are relatively positioned so as to interengage when the picker carrier chain begins to descend from the front chain roll or gear 21. By providing the guides 15—16—17—18 and having the three differently inclined lugs a, b and c on each cross rod 10, as stated and shown, I have provided a simple but effective means for positively holding the picker members rigidly to either of their adjusted positions during their endless travel.

From practical experience, I have found that to obtain the best results when mechanically picking cotton, it is necessary that the wiping or picking action on the plant be practically continuous and that the action of passing the picker surfaces be, at least, as fast as the travel of the machine forward over the plant rows, and for such purpose I have arranged the pickers to travel on different inclines as they pass down onto the plants and rise up with the cotton picked from the plants. By positioning the pickers in the manner stated, the maximum distance spaces between the pickers is maintained as they travel in the upper or horizontal plane, and the distance spaces between the pickers is materially decreased as the pickers are lowered to the plants on the incline shown and before mentioned, and such distance space is still further decreased by having the pickers travel upwardly to the short horizontal position, at which point they assume their maximum distance spaces. To make this clear,— assuming the maximum or normal distance space between the pickers to be two and one-half inches when on their horizontal travel, they are two inches apart when traveling on their lesser or front incline and one and one-half inches apart when traveling up and in their greatest incline; thereby providing, as it were, an almost constant contact of some of the pickers with the cotton boll.

In the practical arrangement of the driving connection between the wheel axle and the chain gear drive, the angular adjustment is such that the pickers are as wide open as possible on the maximum incline or downgoing side so as to get them into the cotton plants without injury to the open bolls and then close them sufficiently to make a clean picking of the opened cotton when coming up the steep ascent.

By reason of arranging the several parts so far as described and shown, ample provision is made for causing the pickers to engage practically every opened boll of cotton, strip the same and carry the cotton up to be discharged into the receivers.

By running the pickers along a short horizontal path, after they have been carried up with the picked cotton, provision is made for again separating the pickers to their maximum distance spaces and also for giving them ample play for passing through a pair of opposing wire brushes 55—55 that engage a number of the pickers at a time, and whose bristles project at right angles to the travel of the said pickers to thereby effect a straddling and combing action on the pickers so as to clear them of their adhering cotton, which then drops into the receivers provided therefor.

Further attention is directed to the showing in Figs. 7 to 12 inclusive which structure seeks to widen the scope of adaptability of my picker by providing a means for adjusting the picking devices bodily to widen and make narrower the spaces between the pickers on the descending and ascending sides respectively.

Since a cotton crop is usually harvested in three pickings, necessitated by the tardy ripening of some of the bolls, care must be taken at the first and second pickings, so as not to close the upgoing pickers too much as they might drag unopened bolls out with them, such unopened bolls being approximately 1 and one-fourth inches in diameter establishes a minimum standard spacing of the pickers.

To provide for the adjustment of the picker frame the same may be so mounted in a structure 56 (see Figs. 7 and 8) that the aperture in a projection 57 may engage similar apertures in a relatively fixed segment 58 and held to its adjustment by a bolt 59, it being readily apparent that the pickers will plunge into the cotton plants more gradually and embrace a greater area in proportion to the forward adjustment of the projection 57.

In order that the pickers may be sustained in a vertical plane on their travels through regions $x$, $y$ and $z$, an adjustment of the track engaging lugs $a$, $b$ and $c$ is necessary, such accomplishment being in the provision of interengaging tooth and notch disks 59, 61, the former being cast integral with the lug casting while the latter is fitted onto the round stub of the picker carrying rods 10. A spring $62^a$ is inserted between the opposing tooth and notch members so that they may be held to the desired adjustment which is effected by pulling the lug casting out until the teeth and notches disengage, turning the lugs to the desired position, and allowing the teeth to spring back into corresponding notches. An annular lip $63^a$ prevents displacement of the parts.

Fig. 10 shows the necessity for the foregoing mode of adjustment; when the picker frame is tilted to coincide with the dotted direction line $d$ (position Fig. 8) the picker fingers must be readjusted to the vertical or full line position in Fig. 10, while the lug casting remains in the dotted position, as shown. Line $e$ shows the angle of downward travel in plane $x$ before the adjustment from Fig. 7 to 8.

Although not illustrated in the drawings, it is understood that I claim the right of adding or reducing the number of picker fingers in their lateral displacement, to or from the number shown in the drawing for instance a lighter cotton crop may require but a single row of pickers, while a heavy cotton crop may require three or four rows.

What I claim is:

1. In a cotton picker, a wheeled vehicle, an endless conveyer mounted thereon, means for directing the conveyer downwardly and rearwardly at the entrance end of the machine, means for guiding the conveyer upwardly and rearwardly toward the exit end of the machine, rigid picker fingers carried by the said conveyer and means for holding the said picker fingers in position with regard to the work and for relatively holding the fingers the more widely spaced apart as they travel downwardly into the cotton plant and the more closely spaced apart as they move upwardly and out of the plant.

2. In a cotton picking machine, a wheeled frame having a longitudinal passage for receiving the plant rows, picking mechanism mounted upon the frame, the said mechanism comprising an endless conveyer, rigid picker members flexibly joined to the conveyer, the said members including picker faces, the said conveyer being set into operation as the wheeled frame is moved for moving the pickers down into the longitudinal passage against the plants, and other means for instantly closing the distance spaces between the pickers from their normal distance as they start upward from their lowest position among the plants.

3. In a cotton picking machine, a wheeled frame having a longitudinal passage for receiving the plant rows, picking mechanism mounted upon the frame, the said mechanism comprising an endless conveyer, rigid picker members flexibly joined to the conveyer, the said members including picker faces, the said conveyer being set into operation as the wheeled frame is moved for moving the pickers down into the longitudinal passage against the plants, other means for closing the distance spaces between the pickers from their normal distance as they move out of the plants and further means for restoring the pickers to their normally spaced relation after they have passed up out of the plants, and other means for cleaning the said pickers after they have resumed their normal spaced relation.

4. In a cotton picker, a wheeled vehicle, an endless conveyer mounted on the vehicle, rigid pickers flexibly joined to the conveyer, and including a body having card-cloth faces, the teeth of which are upwardly inclined relatively to the body, means on the frame for concentrating the plants in the path of movement of the pickers, means for rigidly holding the pickers with respect to the conveyer as they pass through their picking path of movement, and brushes that project at right angles to the path of movement of the pickers and engage the said faces for removing the cotton therefrom.

GEORGE C. PHILLIPS.

Witnesses:
    E. A. HAGGERTY,
    Z. J. LEE.